United States Patent
Schomacker et al.

(10) Patent No.: US 12,357,848 B2
(45) Date of Patent: Jul. 15, 2025

(54) WIND TURBINE TOWER EVACUATION METHOD AND TOOL

(71) Applicant: Vestas Wind Systems A/S, Aarhus N. (DK)

(72) Inventors: Jonas Lerche Schomacker, Solrød Strand (DK); Torben Ladegaard Baun, Skødstrup (DK); Niels Vinther Voigt, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1064 days.

(21) Appl. No.: 17/278,443

(22) PCT Filed: Oct. 30, 2019

(86) PCT No.: PCT/DK2019/050326
§ 371 (c)(1),
(2) Date: Mar. 22, 2021

(87) PCT Pub. No.: WO2020/088729
PCT Pub. Date: May 7, 2020

(65) Prior Publication Data
US 2021/0361979 A1     Nov. 25, 2021

(30) Foreign Application Priority Data

Nov. 1, 2018 (DK) .......................... PA 2018 70714

(51) Int. Cl.
*A62B 1/18* (2006.01)
*F03D 13/20* (2016.01)
*F03D 80/00* (2016.01)

(52) U.S. Cl.
CPC ............... *A62B 1/18* (2013.01); *F03D 13/20* (2016.05); *F03D 80/00* (2016.05); *F05B 2280/1071* (2013.01); *F05B 2280/5008* (2013.01)

(58) Field of Classification Search
CPC ................................ A62B 1/18; F03D 80/00
(Continued)

(56) References Cited

U.S. PATENT DOCUMENTS 3,810,515 A * 5/1974 Ingro .................... A63H 11/04
446/457
4,421,205 A 12/1983 Vranish et al.
(Continued)

FOREIGN PATENT DOCUMENTS

CN     106310547 A     1/2017
CN     106621088 A     5/2017
(Continued)

OTHER PUBLICATIONS

European Patent Office, Examination Report issued in corresponding EP Application No. 19797559.2, dated Feb. 1, 2023.
European Patent Office, partial examination report issued in corresponding European Application EP 19797559.2, mailed Apr. 24, 2023.
(Continued)

*Primary Examiner* — Janet M Wilkens
(74) *Attorney, Agent, or Firm* — Wood Herron & Evans LLP

(57) ABSTRACT

A wind turbine tower evacuation tool is provided including an object end for attachment to an object or a person and a roller end configured for connection to a surface of a wind turbine tower by magnetic attraction. The roller end includes at least one magnet body arranged for rotation around a rotational axis of the roller end. The wind turbine tower evacuation tool further includes a rope element connecting the object end to the roller end.

41 Claims, 15 Drawing Sheets

(58) Field of Classification Search
USPC .......................................................... 182/5
See application file for complete search history.

(56) References Cited

U.S. PATENT DOCUMENTS

| | | | |
|---|---|---|---|
| 6,125,955 A | 10/2000 | Zoretich et al. | |
| 10,532,609 B2 * | 1/2020 | Parrott | B60B 19/12 |
| 11,633,634 B2 * | 4/2023 | Harding | A62B 35/0018 |
| | | | 702/41 |
| 2004/0129494 A1 * | 7/2004 | Cherpitel | A62B 1/14 |
| | | | 182/5 |
| 2014/0069741 A1 * | 3/2014 | Bergmann | F03D 80/50 |
| | | | 182/241 |
| 2015/0090529 A1 * | 4/2015 | Shieh | A62B 1/20 |
| | | | 182/48 |
| 2019/0047824 A1 * | 2/2019 | Ifversen | B66B 11/04 |

FOREIGN PATENT DOCUMENTS

| | | | | |
|---|---|---|---|---|
| DE | 102007003000 A1 | 3/2008 | | |
| EP | 1516846 A2 | 3/2005 | | |
| KR | 100765706 B1 | 10/2007 | | |
| WO | WO-2011025839 A1 * | 3/2011 | ............... | A62B 1/16 |
| WO | WO-2015078480 A1 * | 6/2015 | ............ | B66B 11/02 |
| WO | 2017162249 A1 | 9/2017 | | |

OTHER PUBLICATIONS

European Patent Office, examination report issued in corresponding EP Application No. 19797559.2, dated Jun. 4, 2024.
Danish Patent and Trademark Office, Search and Examination Report in PA 2018 70714, Apr. 3, 2019.
European Patent Office, International Search Report and Written Opinion in PCT Application No. PCT/DK2019/050326, Mar. 18, 2020.

* cited by examiner

WIND TURBINE TOWER EVACUATION METHOD AND TOOL

FIELD OF THE INVENTION

The present invention relates to a wind turbine tower evacuation tool, a wind turbine, a method of evacuating a person from an upper level of a wind turbine and a method for descent and/or ascent of an object along a tower surface of a wind turbine making use of a wind turbine tower evacuation tool.

BACKGROUND OF THE INVENTION

Wind turbines use kinetic energy of the wind to propel a rotor. A generator then converts the rotation of the rotor into electrical power that may be used, stored or provided to a larger electrical grid. In the last decades, in order to obtain higher power outputs, wind turbines rotors have become larger. For example, offshore wind turbines are available with a rotor diameter of more than 160 meters. Both offshore and onshore, the height of modern wind turbine towers is often above 100 meters and wind turbine towers that are above 150 meters are in use too.

For construction and maintenance of the nacelle and other parts of the wind turbine, service people regularly have to go up the wind turbine tower and work high above the ground or water level. In modern wind turbines, lifts are installed in the towers to bring a person to the nacelle at the top or to any intermediate level where work is to be done first and back to the tower base level later. However, in case of emergency, e.g. due to fire, quick evacuation of the person from the upper levels by alternative means may be needed. A proven method for quick evacuation is to use a long evacuation line or zip line, along which the person can make a controlled descent along the tower surface.

One of the problems of this known evacuation method is that, e.g. due to wind, the descending person may start swinging back and forth while going down. When the amplitude of such a swinging motion is too large, there is a risk that the person hits the tower or that the line, with the person, is wound around the tower. Further, such horizontal movement may make it difficult for the person to eventually land at the intended position at the tower base. Currently, at offshore towers, persons often have to put on a wetsuit first in order to avoid cooling down too much when falling into the cold sea water.

In the international patent application published as WO 2017/162249 A1, a descent module is disclosed comprising a basket that is large enough for a person to stand in. The basket is kept close to the steel wind turbine tower surface by two large magnets. Eight wheels on four pivoting axles guide the module along the tower surface during the descent. Although this descent module may overcome some of the practical problems and safety concerns discussed above, it introduces a few new ones. First of all, this is a very expensive and complex solution with lots of parts that require regular technical inspection and maintenance. Secondly, even though it is quite large and bulky, the descent module only has limited capacity. To allow multiple persons to be evacuated simultaneously, multiple descent modules may have to be installed.

It is an object of the present invention to provide a solution to at least some of the problems mentioned above and it is against this background that the present invention has been developed.

SUMMARY OF THE INVENTION

According to the invention this object is achieved by providing a wind turbine tower evacuation tool comprising an object end for attachment to an object and a roller end configured for connection to a surface of a wind turbine tower by magnetic attraction, the roller end comprising at least one magnet body arranged for rotation around a rotational axis of the roller end, the wind turbine tower evacuation tool further comprising a rope element connecting the object end to the roller end.

Amongst the many advantages of the evacuation tool according to the invention is the fact that it is both compact and effective. A person can, e.g., just put the evacuation tool in his tool box or attach it to his belt and will not be dependent on a special descent module being provided at the upper level. While evacuating using a simple evacuation line, the person can just hold the tool at the object end and throw the roller end towards the steel tower of the wind turbine. Magnetic attraction attaches the roller end to the steel tower surface and keeps it attached thereto, while the rolling magnet body makes sure that the tool is guided along the tower surface during the person's descent. The person is then enabled to control his maximum distance to the tower by pulling on the rope connecting the object end to the roller end. It is noted that the rope may, alternatively, be a wire, a chain, a cord, a rod or a different type of elongated tension member. Instead of holding the object end of the evacuation tool in his hand, the person may of course connect it securely to his belt or some other part of his uniform. In this case, means may be mounted on the object end of the rope element for connecting, such as a hook, a Velcro, a swage sleeve or similar to create a wire eye. Further alternatives would be well-known to the skilled person.

With the present invention it is facilitated as well that multiple persons can be evacuated simultaneously without having to make complex and costly installations like with the prior art on descent modules. One tool as described herein for each person accessing the wind turbine is sufficient in case of an emergency as a single evacuation line can be used by multiple persons.

The magnet body may comprise at least one magnet ring. Other rotational symmetric shapes, such as spheres can also be used. In addition to the at least one magnet body, the tool may comprise one or more roller bodies, arranged coaxially with the magnet body for rotation therewith. A spherical magnet body may be particularly useful in an evacuation tool with only one magnet body and no roller bodies. When a combination of magnet bodies and roller bodies is used, it may be preferred to use magnet rings and roller rings.

The roller bodies may be made of a non-magnetic material, such as plastic, but do preferably comprise a magnetic metal in order to strengthen the magnetic field and improve the attachment to the tower surface. In a modular setup, magnet bodies may be added or removed to adjust the attractive force to circumstances such as the weight of the person and the amount of steel in the tower. Also the material, number and dimensions of the roller bodies may be flexible. Regardless of the material that is used for the roller bodies, it may be advantageous to ensure that an outer radius of the roller bodies is larger than an outer radius of the magnet body in order to avoid direct contact between the magnet body and the tower surface which might impede the rolling behaviour of the roller end. In a special embodiment that is especially useful for wind turbine towers with a smaller diameter, the roller surfaces of the roller bodies and/or the magnet bodies may be slightly curved in order to match the shape of the tower surface. Although such a curved roller surface may make the roller end less useful for use with differently sized wind turbine towers, the curves may help to automatically align the roller end during the descent and keep it rolling in parallel with the longitudinal axis of the tower.

In an embodiment of the invention, the rotational axis is defined by an axle and the at least one magnet body and roller body are provided on the axle. Preferably, such an evacuation tool comprises at least two roller bodies and the at least one magnet body is provided on the axle, in between the at least two roller bodies.

For understanding the invention, it is important to note that throughout this description of the invention, the term 'magnet ring' or 'magnet body' is used for permanently magnetized rings or bodies. 'Magnetic metal' or 'magnetic material' refers to ferromagnetic materials that will be strongly attracted to the permanent magnet rings.

In some preferred exemplary embodiments, that will be described in more detail later with reference to the drawings, the magnet bodies and the roller bodies are embodied as rings. Alternatively, the bodies may be spherical, conical, frusto-conical or frusto-spherical. For example, the roller end comprises a plurality of roller rings and magnet rings, alternatingly provided along the rotational axis. A modular design wherein the number, the magnetic strength and the magnetic orientation of the magnetic rings can be varied makes it possible to obtain a roller end with a magnetic field that suits the particular situation. Depending on, e.g., the weight of the person and the amount of steel in the wind turbine tower, different roller end designs may be preferred.

In a roller end comprising multiple magnet rings, all the magnet rings may have the same magnetic orientation. As a result, the roller end will have a significant magnetic field at larger distances from the device, both in the axial and in the radial direction. Although this may help with catching a hold of the tower in the first place, large magnetic fields at larger distances can also cause problems with electronics and with the roller end unintendedly clinging on to other steel parts on the way out of the nacelle.

Alternatively, at least two of the magnet rings have opposite magnetic orientations. Placing two magnet rings with opposite magnetic orientation works best if they are separated by a body of magnetic metal to which they can both adhere. The opposite orientation results in a stronger magnetic field closer to the surface of the roller end and a weaker magnetic field around it. This leads to stronger adherence to the wind turbine tower surface, without the disadvantages mentioned above for an array of equally aligned magnet rings. A suitable selection and alignment of magnet rings can simultaneously achieve good attachment when throwing the roller end to the tower, and a good holding force when attached. When using an uneven number of magnet rings with alternating magnetic orientations, the roller end will have an overall magnetic field. This overall magnetic field can then assist attachment to the steel tower surface while the alternating magnet rings enhance the holding force. Of course, also aligned magnet rings can be provided in uneven numbers, but aligned magnets will also create an overall magnetic field when an even number of magnet rings is used.

Optionally, also the roller bodies are permanent magnets. Although this will provide for a stronger magnetic field, it will lead to direct contact between the permanent magnets and the tower surfaces and makes it difficult to use different magnetic orientations in one roller end.

The roller end may comprise two non-magnetic end caps, provided around the rotational axis. When the end caps are made of a non-magnetic material, such as plastic, this avoids the end caps themselves attaching to the tower surface and assures that the outer surfaces of the roller bodies connect to and can roll over the wind turbine tower surface. Preferably, also the end caps have an outer radius that is smaller than the outer radius of the roller rings, such that also the end caps will roll over the tower surface during the descent. Giving the end caps a conical, frustoconical or frustospherical shape will assist in correctly aligning the roller end with the tower surface when the end cap hits that surface first.

In some embodiments, the end caps comprise string attachment features for the attachment of a rope connecting the roller end to the object end, the attachment features being arranged so as not to rotate together with the roller rings. For example, a short rope may directly connect the attachment features at both end caps, while a longer rope is attached somewhere halfway that short rope, the longer rope leading to the object end of the evacuation tool. However, also other arrangements are possible. It is preferred that the points of connection between the rope (or ropes) and the roller end do not rotate together with the roller rings in order to avoid the rope being tangled up with the roller end of the evacuation tool during use. When the attachment features are positioned at a radially outward portion of the end caps, a simple pull at the rope may suffice to topple the roller end over when one of the end caps is attached to the tower surface.

The roller rings and the at least one magnet ring may be fixedly connected to an axle for rotation therewith. Alternatively, the roller rings and the at least one magnet ring are rotatably provided on an axle for rotation relative thereto. A non-magnetic core body may be provided in around the rotational axis and radially inward of the magnet and roller rings. This non-magnetic body may either be fixedly or rotatably connected to the axle and/or the magnet and roller rings.

In a special embodiment, the roller end comprises an asymmetrically shaped connector body, centrally provided on the axle and radially extending therefrom, the connector body comprising a connector attachment feature for the attachment of the rope element to the roller end, the attachment feature being arranged so as not to rotate together with the roller bodies. As opposed to the embodiment described above, where a rope was attached at both end caps, this special embodiment only needs a single point of connection. The asymmetric shape of the connector body allows for a similar topple-by-pulling action as already discussed for the earlier embodiment. This embodiment does not need strings to be attached to end caps at the two outer ends of the roller end.

According to another aspect of the invention, a wind turbine comprising a steel tower is provided comprising an upper level and an evacuation line, the upper level comprising an evacuation line connection point for securely connecting the evacuation line to the upper level in such a way to allow a person to use the evacuation line for a controlled descent along a surface of a tower of the wind turbine. The wind turbine further comprises at least one of the tower evacuation tools described above.

According to yet another aspect of the invention, a method is provided for evacuating a person from an upper level of a wind turbine steel tower, making use of a wind turbine tower evacuation tool. The wind turbine tower evacuation tool comprises an object end, a roller end and a rope element connected therebetween. The method comprises the steps of:

connecting the person to an evacuation line and to the object end, the person leaving the upper level and using the evacuation line for a controlled descent along a surface of a tower of the wind turbine, the person throwing or otherwise bringing the roller end in close proximity to the surface of the tower, the roller end connecting to the surface of the tower by magnetic attraction, and the roller end rolling over the surface of the tower during a remaining portion of the controlled descent.

This method allows the person to pull himself or herself closer to the wind turbine tower surface by pulling on the rope element. In a similar way, this person can controllably release the rope element, e.g. by loosening the grip while letting it slide through his hand or by using a free hand for gripping it closer to the object end and then releasing the hand that is closer to the roller end. When controllably releasing the rope element, the person allows for further separation from the surface of the tower. By using this inventive tool during the evacuation, the person is enabled to control his distance to the tower during his descent and is ensured a safe evacuation and a landing close to the tower base. Furthermore, the person is less reliant on special equipment to be provided and well-maintained at the upper level of the wind turbine tower.

When the person pulls the rope, he can bring a rotational axis of the roller end in parallel alignment with a horizontal tangent to the surface of the tower. Alternatively, a pull of the rope may result in a change of said rotational axis along a non-parallel direction by a non-uniform pulling force in the roller end along said rotational axis.

According to yet another aspect of the invention, a method is provided for the descent and/or ascent of an object along a tower surface of a wind turbine, making use of a wind turbine tower evacuation tool as described above. With the evacuation tool according to the invention, objects can be transported up and down while keeping within a short distance from the tower surface. This avoids the objects swinging around the tower or hitting the tower at high speed, which may cause damage and lead to safety concerns when parts of those objects may come off.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

For a better understanding of the invention, some embodiments of the invention will now be described with reference to the following drawings, in which.

DETAILED DESCRIPTION

Figure 1:
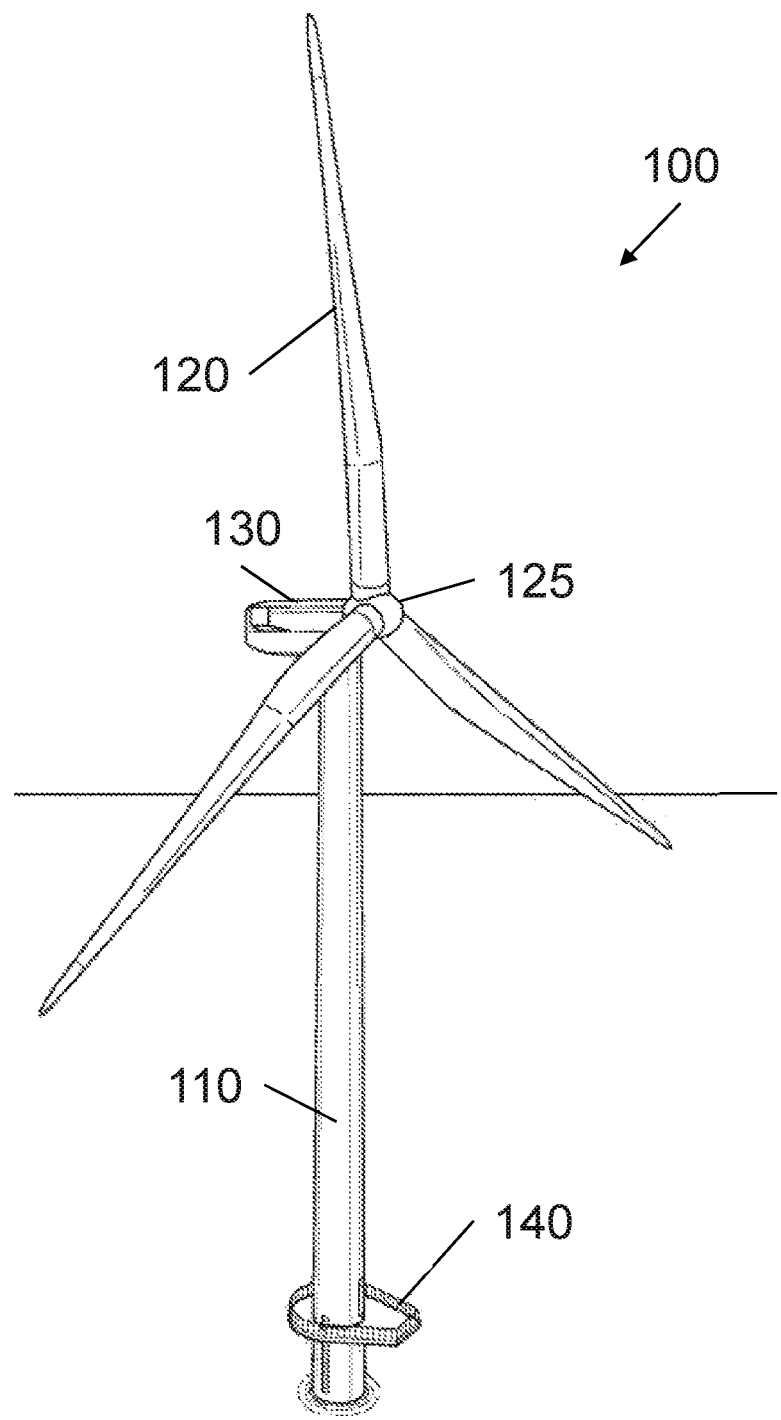
FIG. 1 shows a schematic representation of a wind turbine.

FIG. 1 shows a schematic representation of a horizontal axis wind turbine 100 that converts kinetic energy of the wind into electrical energy that can be used locally, stored in a battery or fed into a larger electrical grid. In this figure, an offshore wind turbine 100 is shown, but the invention is similarly useful for use with onshore wind turbines. The wind turbine 100 comprises a large wind turbine tower 110 that may be about 100 m high, but may also be even taller. The wind turbine 100 of FIG. 1 is placed on a transition piece 140 that is placed on a foundation that is provided on the ocean floor. The transition piece 140 comprises a platform from which persons can access the tower 110 that is installed on top of the transition piece 140. At the top of the wind turbine tower 110, a nacelle 130 is provided that typically comprises further equipment that is needed for realising the desired energy conversion. A rotor comprising a rotor hub 125 and a number of rotor blades 120 is rotatably attached to the nacelle 130. In this exemplary wind turbine 100, three rotor blades 120 are used, but rotors with different numbers of rotor blades 120 are also possible. When active, the large rotor blades 120 are yawed into the wind, such that the wind blowing through the rotor makes the rotor rotate. The rotor hub 125 is connected to a power train that is provided in the nacelle 130. The power train at least comprises a generator for converting the rotational motion of the hub into electrical energy, but typically also other functional parts such as a main bearing supporting the rotor hub and a rotating shaft connected thereto, and a gearbox for increasing the rotational speed of the generator input shaft.

For the construction and maintenance of a wind turbine 100, it is often necessary that service people go up the tower and work at the nacelle 130 or at a different level in between the bottom of the tower 110 and the nacelle 130. This movement up and down is typically via internal ladders or in some larger wind turbines 100, lifts are provided for transporting a person up and down. However, in case of emergency, e.g. a fire, the person may have to evacuate in an alternative way. The quickest, and therefore usually safest, way of leaving the tower 110 in case of emergency is to jump off. It is known to use a long evacuation line along which the person can make a controlled descent along the tower surface. When jumping off the tower 110, the person may use standard tools or techniques for braking while gliding along a fixed evacuation line. Alternatively, the person falls down while holding one end of the evacuation line and some commonly used pulley system allows the person to control the falling speed or at least to limit the speed to a safe value.

One of the problems of this known evacuation method is that, e.g. due to wind, the descending person may start swinging back and forth while going down. When the amplitude of such a swinging motion is too large, there is a risk that the person hits the tower 110 or that the line, with the person, is wound around the tower 110. Further, such horizontal movement may make it difficult for the person to eventually land at the intended position at the tower base. The tool and method according to the invention are intended to be used for both onshore and offshore wind turbines, but especially at offshore wind turbines landing near the tower base is important. Currently, at offshore towers 110, persons often have to put on a wetsuit first in order to avoid cooling down too much when falling into the cold sea water. With the current invention, it will be a lot easier for a person to land on the transition piece 140 (if available). Because the person can easily control his/her distance to the tower while descending along the tower surface, the use of a wetsuit might not be required anymore.

Figure 2:
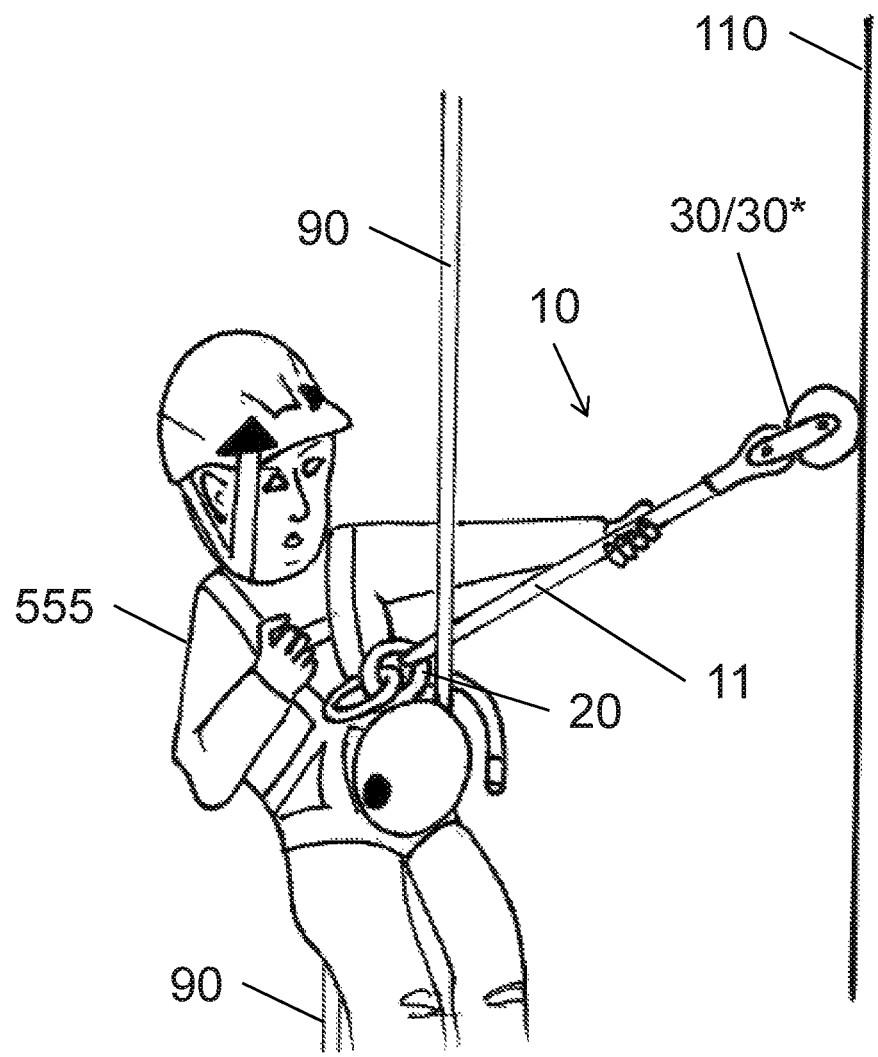
FIGS. 2 and 3 show a person evacuating from an upper level of a wind turbine, making use of an evacuation tool and method according to the invention.
Figure 3:
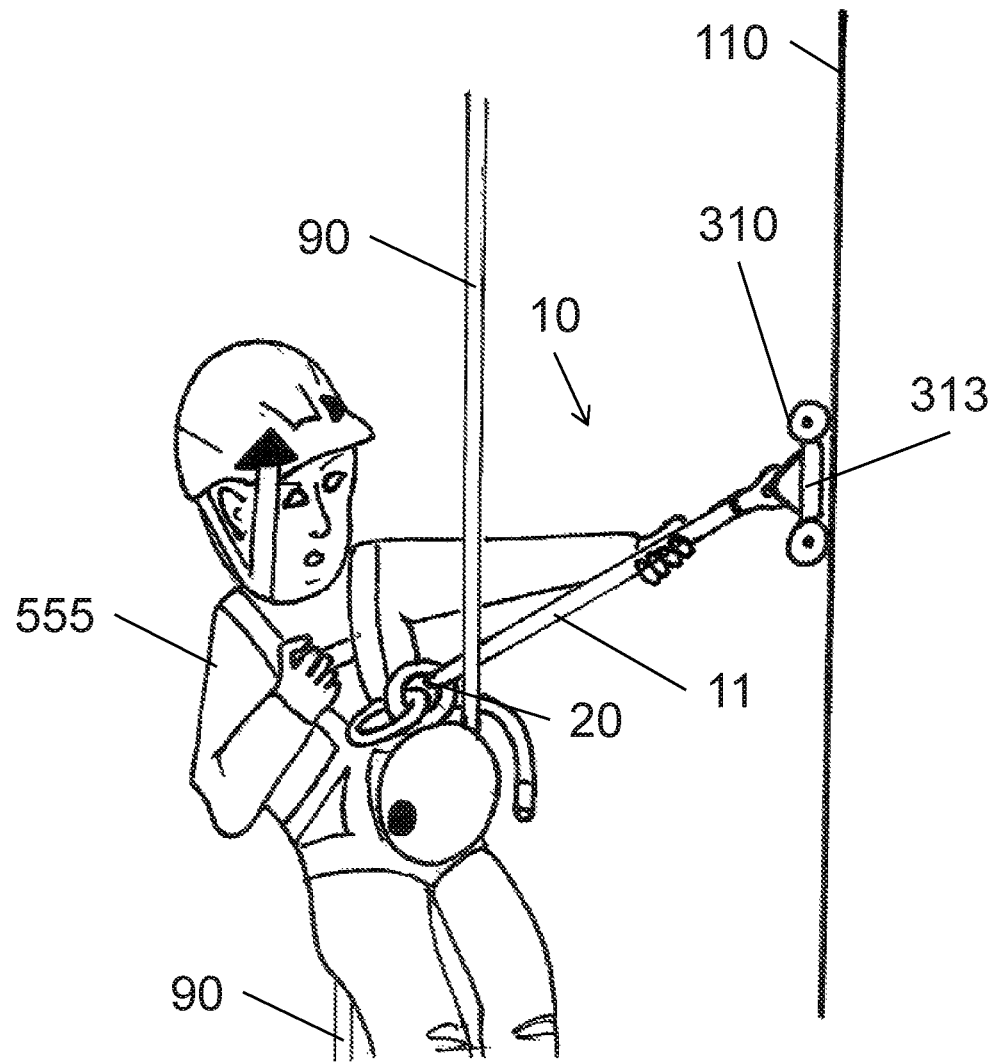

FIGS. 2 and 3 show a person 555 using the evacuation tool 10 to evacuate from an upper level of a wind turbine 100, making use of an evacuation line 90 or zip line 90 and an evacuation tool 10 according to the invention. Such evacuation line 90 may be a rope or a wire or other known materials for this purpose. Typically, this evacuation line may be accommodated in a flaked or coiled state when not in use. At an object end 20 of the evacuation tool 10, a ring is provided for securely attaching the evacuation tool 10 to the person 555. After securely connecting himself to the evacuation tool 10 and the evacuation line 90, the person 555 is ready to jump from the upper tower level. Generally, a door or hatch in the wall, or preferably, in the bottom of the nacelle 130 is provided for allowing the evacuation line to be dropped down and the person 555 to jump out of the nacelle in case of emergency. Preferably, the nacelle 130 is yawed into an optimal orientation before the door or hatch is opened. For example, offshore it is preferred to jump from the upper level at a position directly above the platform on the transition piece 140. In heavy wind situations, it may be safer and easier to make the descent at a side of the wind turbine tower 110 where the risk of being blown or swung into the tower surface is minimal. Hatches in the bottom of the nacelle may be close to the tower but will often be positioned in the rear of the nacelle due to more space available here for the hatch and/or due to this being a better place for using an internal winch for replacing components. This rear positioning results in some distance from the hatch to the tower wall. Hence, it is often seen that a connection point for an evacuation line is a distance away from the tower, such as at least 1 m, at least 2 m, or at least 3 or at least 4 m. This distance makes the present invention even more suitable, as it is impossible in prior art solutions to get support from the wind turbine tower wall when doing an emergency escape several meters away from the tower wall. On the contrary this distance may often create an increased risk if wind gusts create a pendulum effect on a person descending. With embodiments of the present invention, a person, preferably with equipment to releasably attach to and perform a controlled descent along an evacuation line 90 for an object 500 or a person 555 will be able to be supported by the tower wall during a descend.

During use, i.e. during a major portion of the descent, the roller end 30/301/302/303/304/310 of the evacuation tool 10 is magnetically attached to the tower surface. While the person 555 descends along the tower surface, the roller end **30/30\*/310 rolls over the surface. The roller end 30/30\* in FIG. 2 comprises a single rotational axis with at least one magnet body (33) arranged for rotation therearound. Examples of such roller ends will be described in more detail below with reference to FIGS. 4-14. The roller end 310 of FIG. 3 has a different design. It uses two rotational axes with wheels and has one or more magnets 313 provided in between the rotational axes for mechanically attracting the roller end 310 to the tower surface. The wheel diameter is large enough to avoid that the magnets 313** attach themselves to the tower surface. The wheels may be, but do not necessarily need to be, magnets too and in addition to magnet wheels, non-magnet wheels may be provided. Alternative embodiments may comprise more than 2 rotation axes with wheels.

The object end 20 and the roller end **30/30\*/310 are connected to each other by a rope element, e.g., a rope 11. During the descent, the person 555 can bring himself closer to the tower 110 by pulling on the rope 11 or allow himself to move away from the tower 110 by releasing the rope 11. The rope 11 may also be used for manually swinging the roller end 30/30\*/310 towards the tower surface for connecting it thereto. For easier attachment over larger distances, a spring or gas gun may be provided, allowing the person to shoot the roller end 30/30\*/310 towards the tower 110. Instead of a rope 11, other rope elements may connect the two ends 20, 30/30\*/310 of the evacuation tool 10. For example, a wire, a chain or a cord may function in a way very similar to the rope as an elongated flexible tension member. Primarily in the case of descent and/or ascent of an object along the tower, an elongated but less flexible rope element, e.g. made of plastic, can also be used. A less flexible connection allows to automatically keep a constant distance to the tower surface but may make it more difficult to attach the roller end 30/30\*/310 to the tower surface when the person 555 is not close enough. As a further alternative, a telescoping rope element may be used. Especially in the event of a less flexible rope element 11, but also when the rope element 11 is more flexible, it may be advantageous to add a spring or otherwise resilient element to the rope element. The addition of a spring allows for some variation of the distance to the tower 110 and reduces the risk of a sudden gust of wind detaching the roller end 30 from the tower surface 110. The spring element may be integrated with the rope element 11 itself or may be used for connecting the object end 20 and/or the roller end 30 to the rope element 11**.

Figure 4:
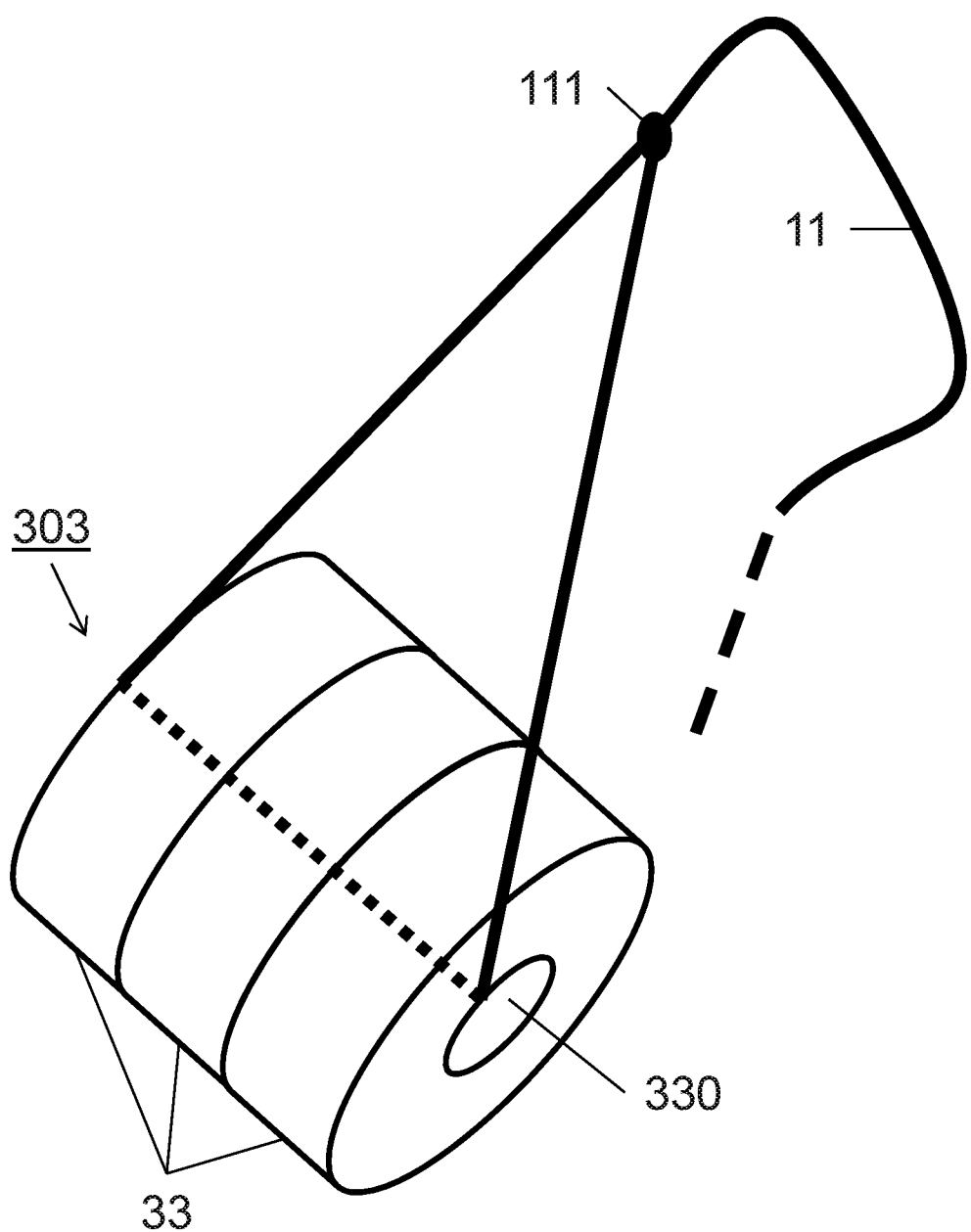
FIG. 4 shows a basic embodiment of the roller end of an embodiment of the evacuation tool according to the invention.

FIG. 4 shows a basic embodiment of the roller end 303 of an embodiment of the evacuation tool 10 according to the invention. The roller end 303 comprises three magnet rings 33 of equal diameter. A rope or chord 11 is pulled through the magnet ring centres 330 and tied in a knot 111 from which a single string leads to the object end 20 of the evacuation tool 10. If a roller end 303 with a different attractive force is desired, magnet rings 33 can be added or removed. Also, one or more of the magnet rings may be replaced by roller rings made of a magnetic metal or non-magnetic material. In the here shown example, all rings have the same diameter. Alternatively, one or more of the rings may have a different diameter. For example, the two outer rings may be roller rings with a slightly larger diameter than the magnet ring 33 in the middle. When the roller rings are then made of a magnetic metal or non-magnetic material, direct contact between the magnet rings 33 and the tower surface is avoided.

Figure 5:
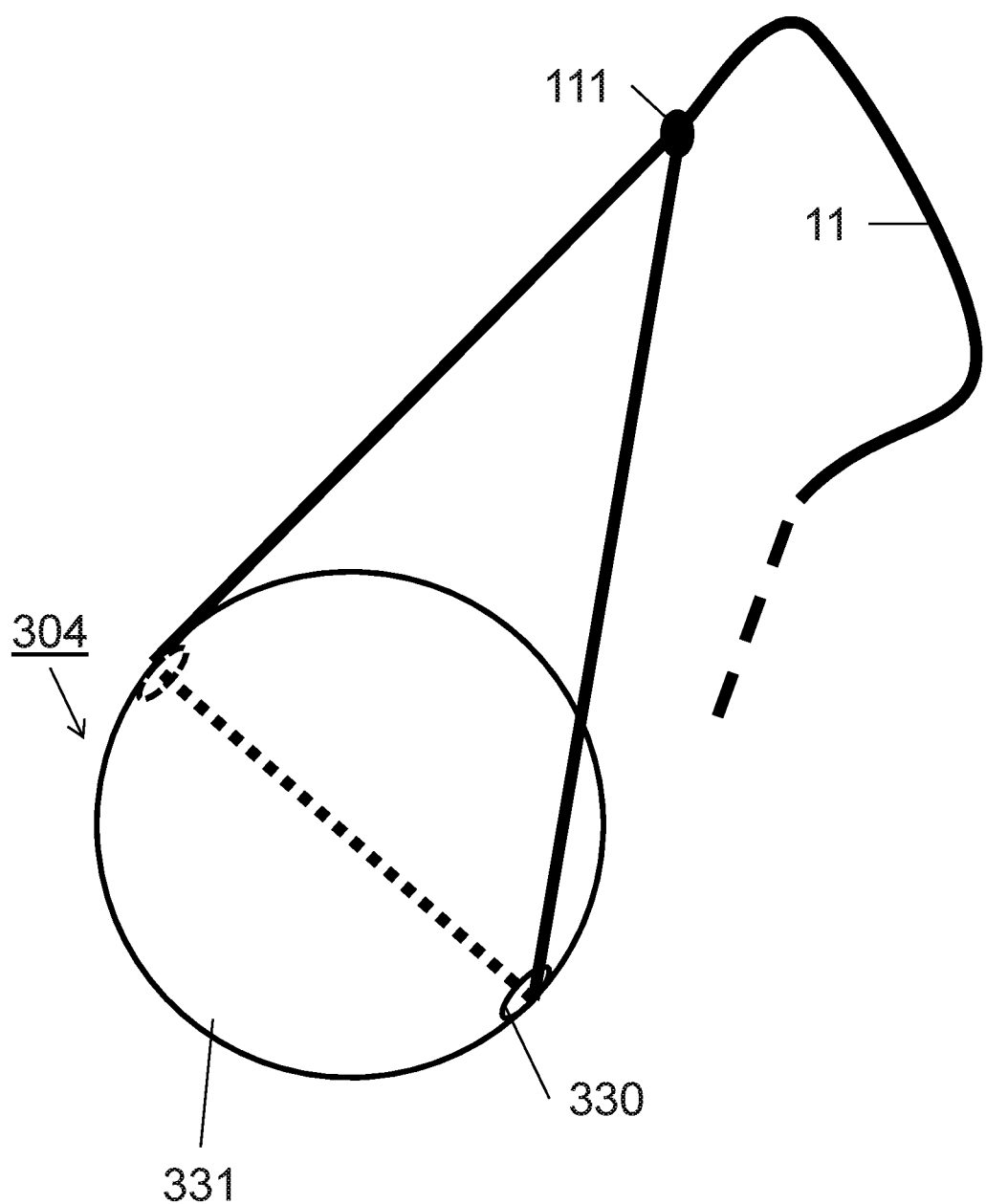
FIG. 5 shows another basic embodiment of the roller end of an embodiment of the evacuation tool according to the invention.

FIG. 5 shows a similar roller end 304. Here, the rolling element is a spherical magnet 331 with a central bore 330 for attachment of the rope or chord 11. Possible alternative embodiments may comprise multiple spherical magnets 331 or a mixture of spherical magnets and non-magnet spheres. Also a combination of spheres and rings can be used in a similar way.

Figure 6:
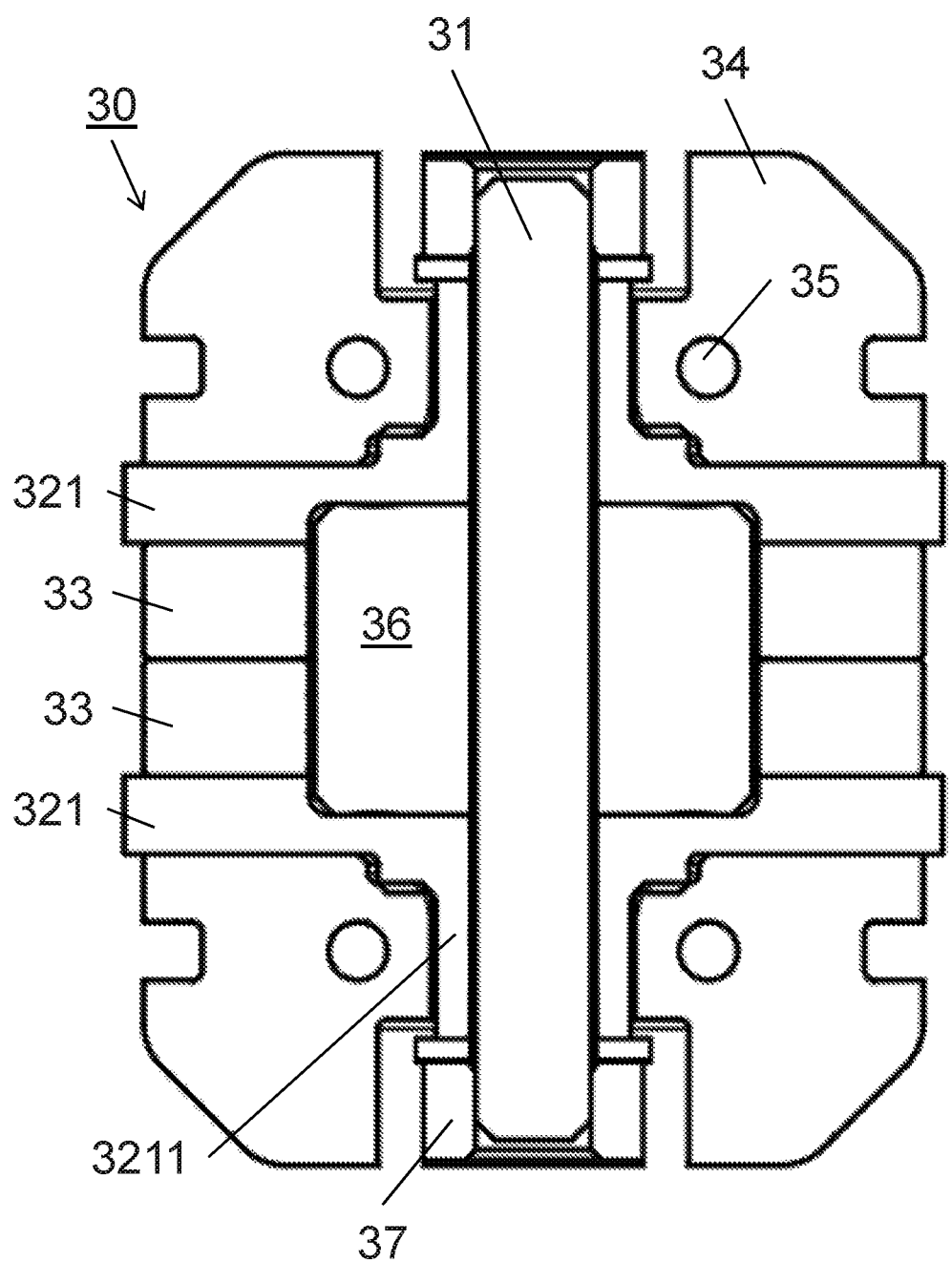
FIG. 6 shows a cross section of the roller end of a second embodiment of the evacuation tool according to the invention.

FIG. 6 shows a cross section of the roller end 30 of an embodiment of the evacuation tool 10 according to the invention. The roller end 30 comprises an axle 31, preferably made of a non-magnetic material to avoid direct attachment to the tower surface. An optional core body 36 of non-magnetic and preferably lightweight material, e.g. a polymeric material, is provided on the axle 31. The core body 36 may or may not be rotatable with respect to the axle 31. One or more magnet rings 33 are provided around the core body 36. The advantage of using a lightweight core body 36 is that the total weight of the tool 10 is kept relatively low, while still having a strong magnetic field near its outer surface. The exact strength of the magnetic field can be tuned easily by merely changing the number and width of the magnet rings 33 on the axle 31.

At each side of the magnet rings 33, roller bodies 321 of a magnetic metal such as iron, or a magnetic alloy such as steel, are provided. Due to the magnetic attraction of the magnet rings 33, the roller bodies 321 and the magnet rings 33 will together form one solid block that rotates around or together with the axle 31. In this embodiment, the roller bodies 321 are provided as rings with a hollow shaft extension 3211 at their centre. The hollow shaft extension 3211 is slightly wider than the diameter of the non-magnetic axle 31, which provides for a smooth rotation of the solid metal block around the axle 31. The diameter of the roller bodies 321 is preferably slightly larger than the outer radius of the magnet rings 33, such that the magnet rings 33 cannot attach themselves to the tower surface and only the roller bodies 32 are in direct contact with the tower 110 during the descent. This may further help with finding the right balance between strong attachment and smooth rolling.

At both outer ends of the roller end 30, a non-magnetic end cap 34 is provided. Like the core body 36, the end caps may be made of a polymeric material. Nuts 37 are used to keep all elements on the axle 31. Preferably the end caps 34 are arranged on the axle 31 in such a way that they don't rotate together with the roller bodies 321. If they do, the attachment features 35 may be provided in a ring that does not rotate with the end caps 34 in order to avoid the string pieces rolling up or becoming entangled while rolling down the tower surface. The advantage of a non-magnetic end cap 34 is that it makes it less likely that the roller end 30 will attach itself to the tower surface with its end surfaces instead of with the cylindrical rolling surfaces of the roller bodies 321. Attachment features 35 may be provided in the end caps 34 to allow the attachment of a piece of string that connects the roller end to the connector rope 11. The string attachment features 35 may be provided anywhere on the end caps, but if they are provided at a radially outward position it will be easier to correctly align the roller end 30 when the end surface is attached to the tower surface. A simple pull on the connector rope may suffice to realign the roller end 30. Rounded end cap corners may further assist in the realignment.

Figure 7:
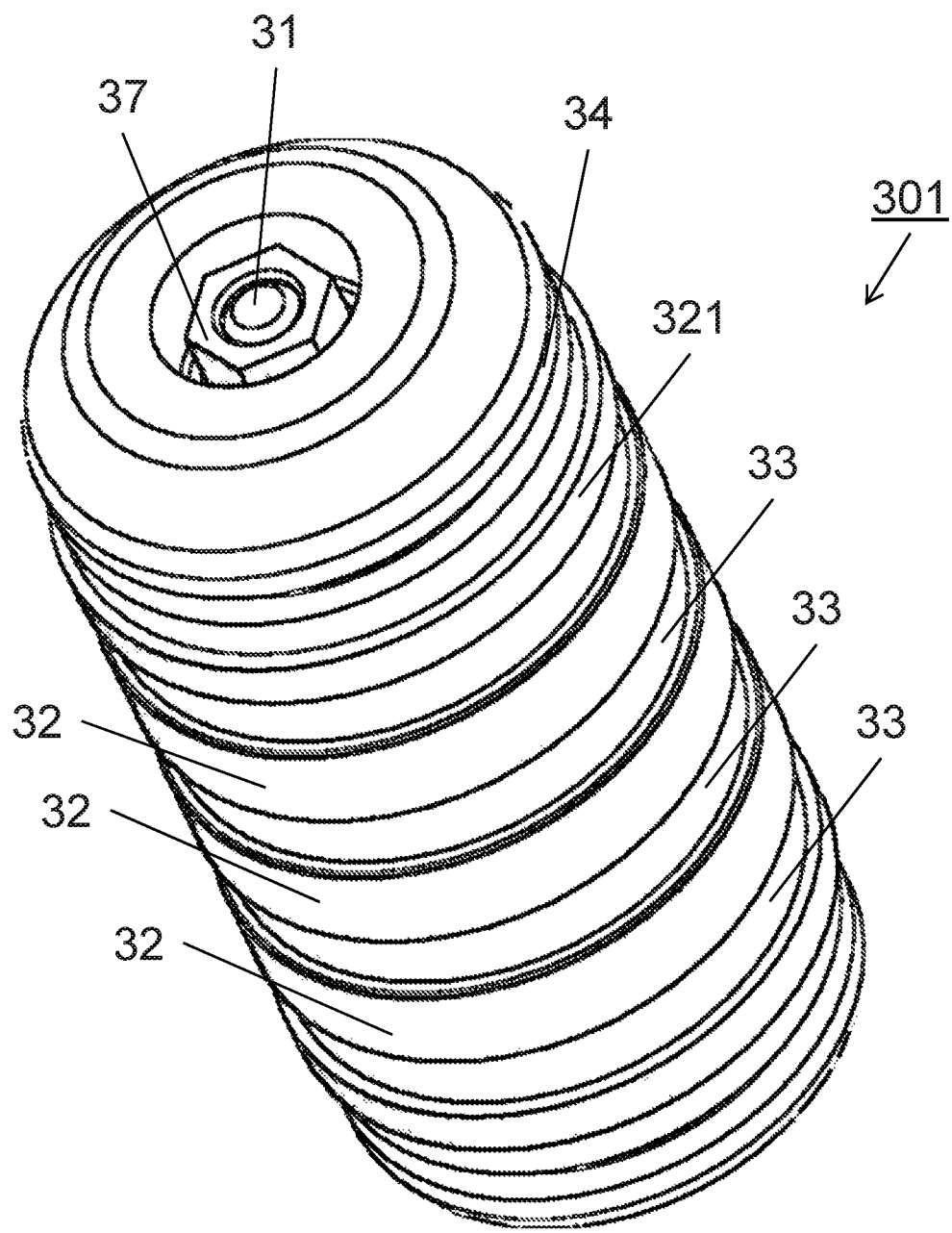
FIG. 7 shows a perspective view of the roller end of another embodiment of the evacuation tool according to the invention.
Figure 8:
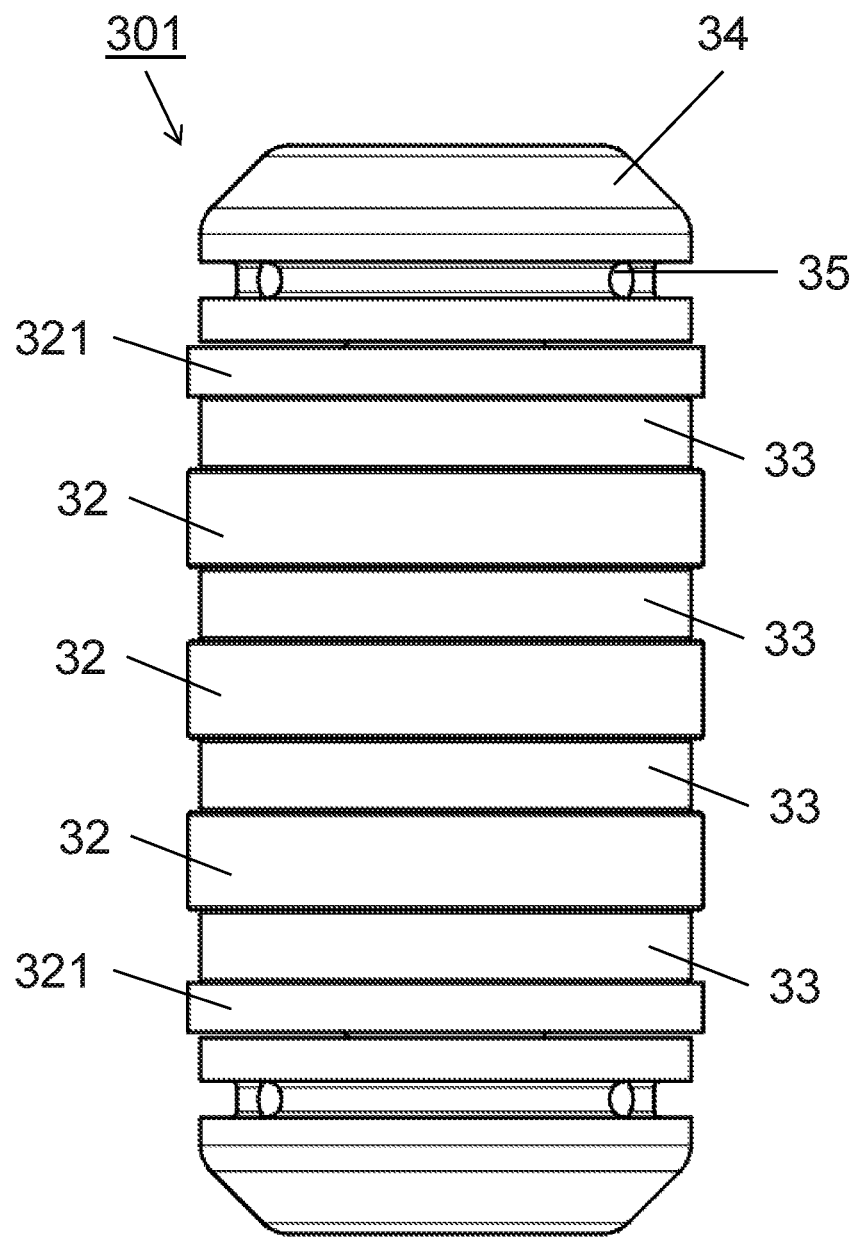
FIG. 8 shows a side view of the roller end of FIG. 7.
Figure 9:
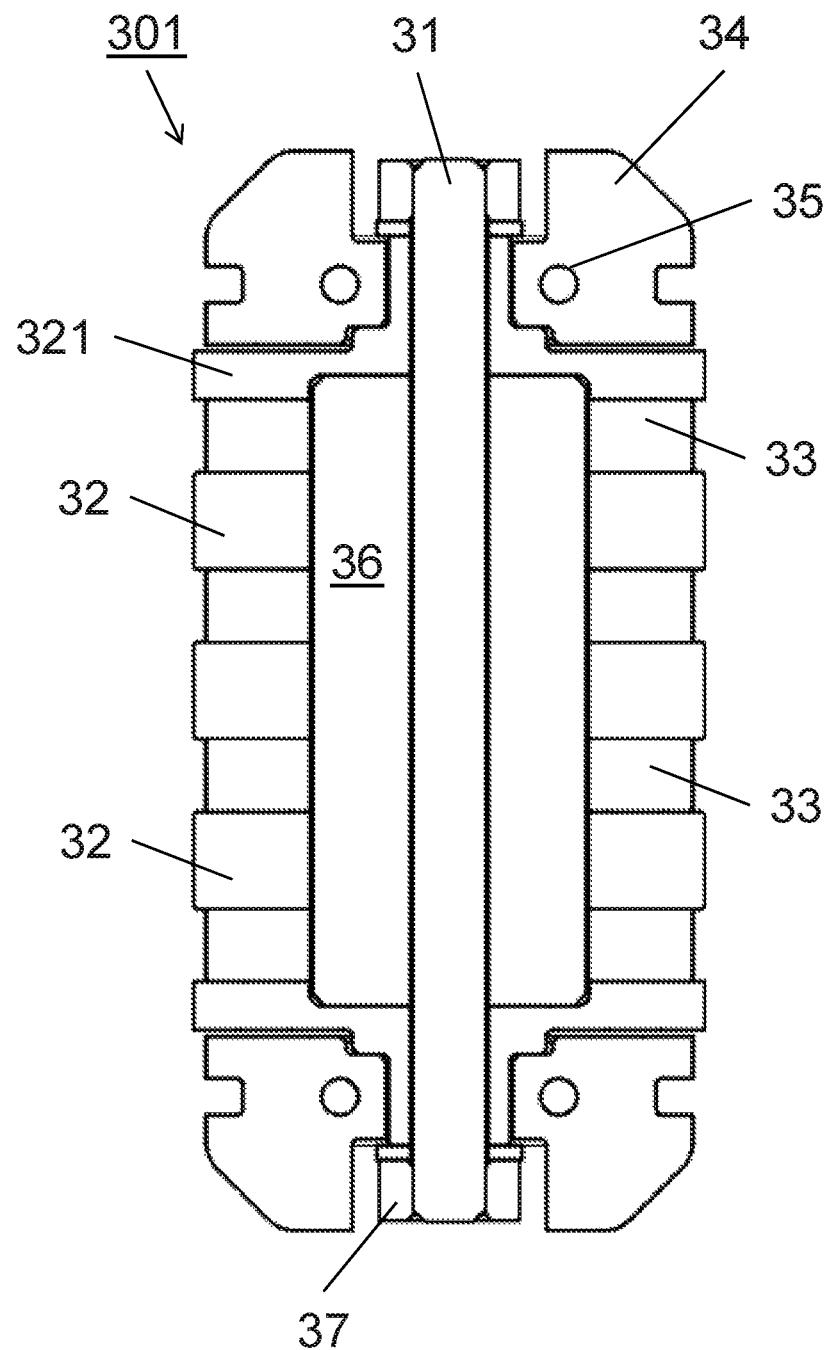
FIG. 9 shows a cross section of the roller end of FIG. 7.

FIG. 7 shows a perspective view of the roller end 301 of another embodiment of the evacuation tool 10 according to the invention. FIG. 8 shows a side view of the same and FIG. 9 shows a cross section. The main difference with the embodiment shown in FIG. 6 is that it comprises more roller bodies 32, 321 and magnet rings 33. Five roller bodies 32, 321 and four magnet rings 33 are alternatingly provided on the axle 31. The outer roller bodies 321 are the same as or similar to the roller bodies described above with reference to the embodiment of FIG. 4. The three inner roller bodies 32 are roller rings 32, preferably of the same metal and with the same outer radius as the outer roller bodies 321. Alternatively, some or all of the roller bodies 32, 321 may be made of non-magnetic metal or other non-magnetic materials such as plastics. The use of non-magnetizable materials for the roller bodies will significantly reduce the strength of the magnetic field and the attractive force between the roller end 301 and the tower surface, but this can, e.g., be compensated by adding additional magnet rings 33 to the axle 31.

Having metal rings 32 in between the magnet rings 33 also increases the opportunities for controlling and designing the shape and strength of the magnetic field created by the roller end 301. When all the magnet rings 33 in the roller end 301 have the same magnetic orientation, the roller end 301 has a relatively strong magnetic field at larger distances from the device, both in the axial and in the radial direction. Although this may help with catching a hold of the tower 110 in the first place, large magnetic fields at larger distances can also cause problems with electronics and with the roller end 301 unintendedly clinging on to other steel parts on the way out of the nacelle.

With a metal roller ring 32 in between two magnet rings 33, it is also possible to have two adjacent magnet rings 33 with opposite magnetic orientations. Each magnet ring 33 will magnetically adhere to the roller ring 32. The opposite magnetic orientation results in a stronger magnetic field closer to the surface of the roller end 301 and a weaker magnetic field around it. With an even number, such as four, of alternatingly oriented magnet rings 33, the roller end 301 has identical magnetic poles at its outer ends. As a result the roller end 301 will not have an overall magnetic field at larger distances, which leads to stronger adherence to the wind turbine tower surface, without the disadvantages mentioned above for an array of equally aligned magnet rings 33. When using an uneven number of magnet rings 33 with alternating magnetic orientations, the roller end will have an overall magnetic field with a North pole at one end and a South pole at the other. This overall magnetic field can then assist attachment to the tower surface while the alternating magnet rings 33 enhance the holding force. A suitable selection and alignment of magnet rings 33 can simultaneously achieve good attachment when throwing the roller end 301 to the tower 110, and a good holding force when attached. Of course, also aligned magnet rings 33 can be provided in uneven numbers but aligned magnets 33 will also create an overall magnetic field when an even number of magnet rings 33 is used.

Figure 10:
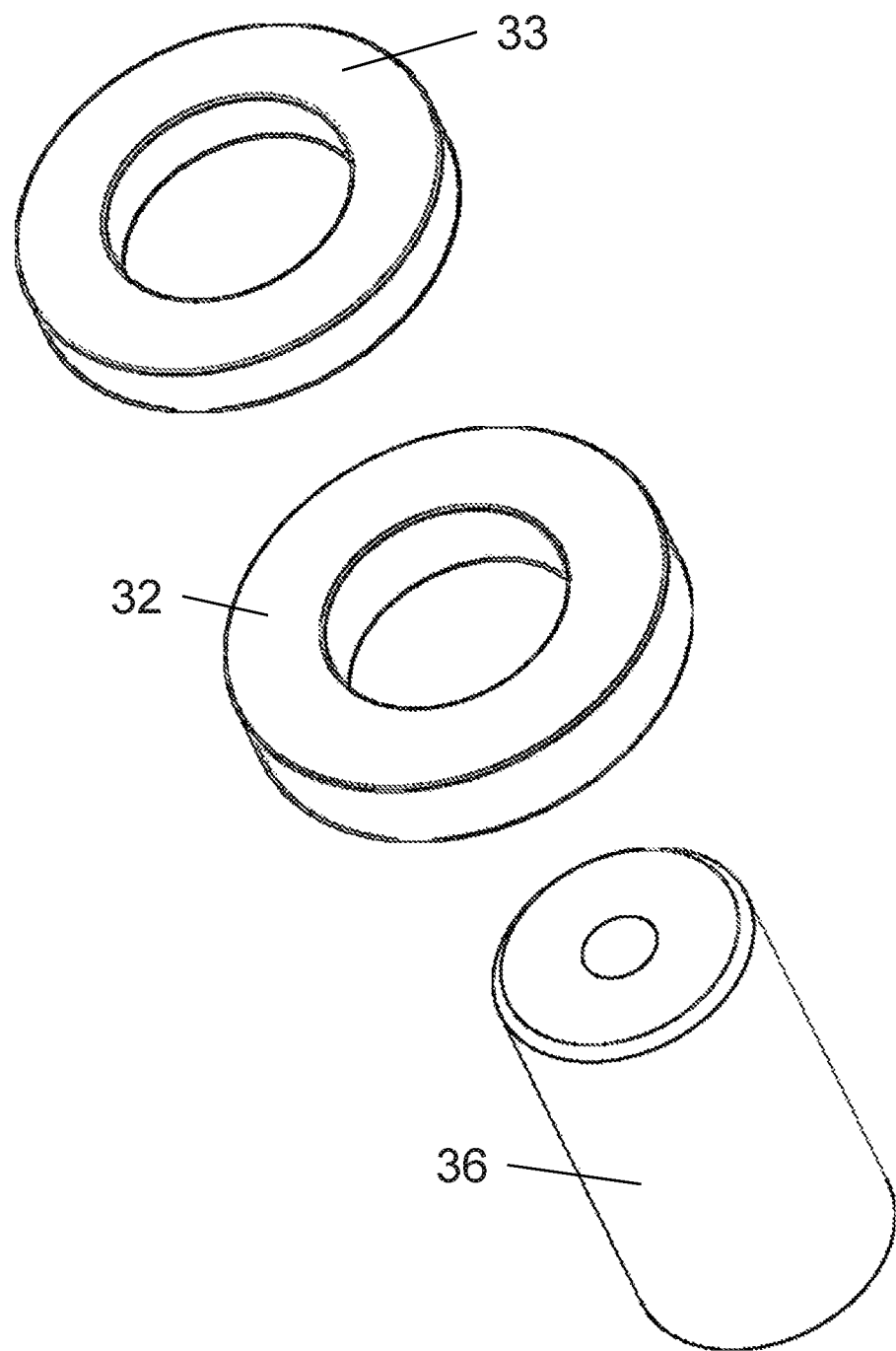
FIGS. 10, 11 and 12 show some parts of the roller end of FIGS. 6 and 7.
Figure 11:
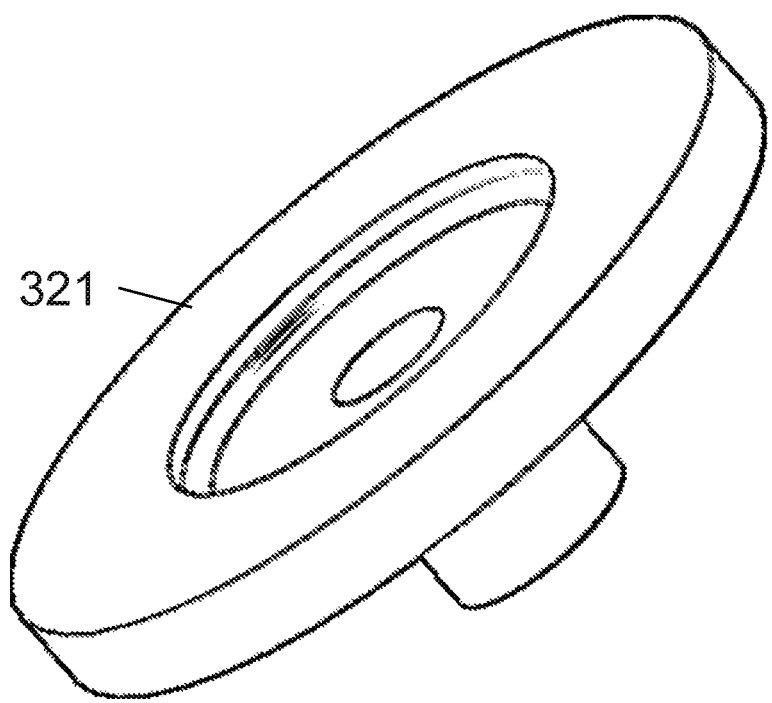
Figure 12:
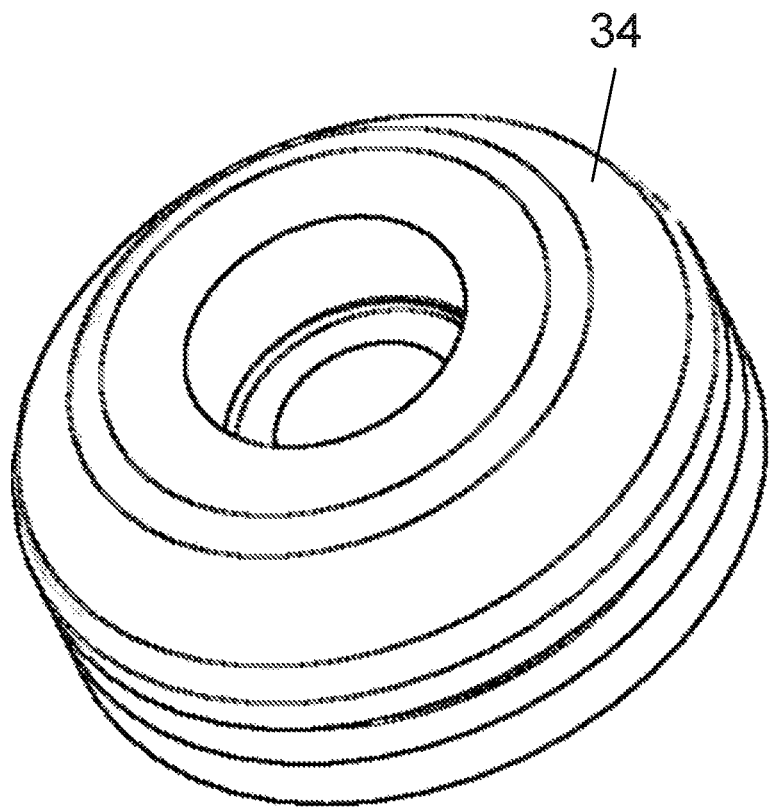

FIGS. 10, 11 and 12 show some parts of the roller end of FIGS. 6 and 7. FIG. 10 shows the body core 36, a magnet ring 33 and a roller ring 32. FIG. 11 shows one of the outer roller bodies 321. FIG. 12 shows an example of a non-magnetic end cap 34.

Figure 13:
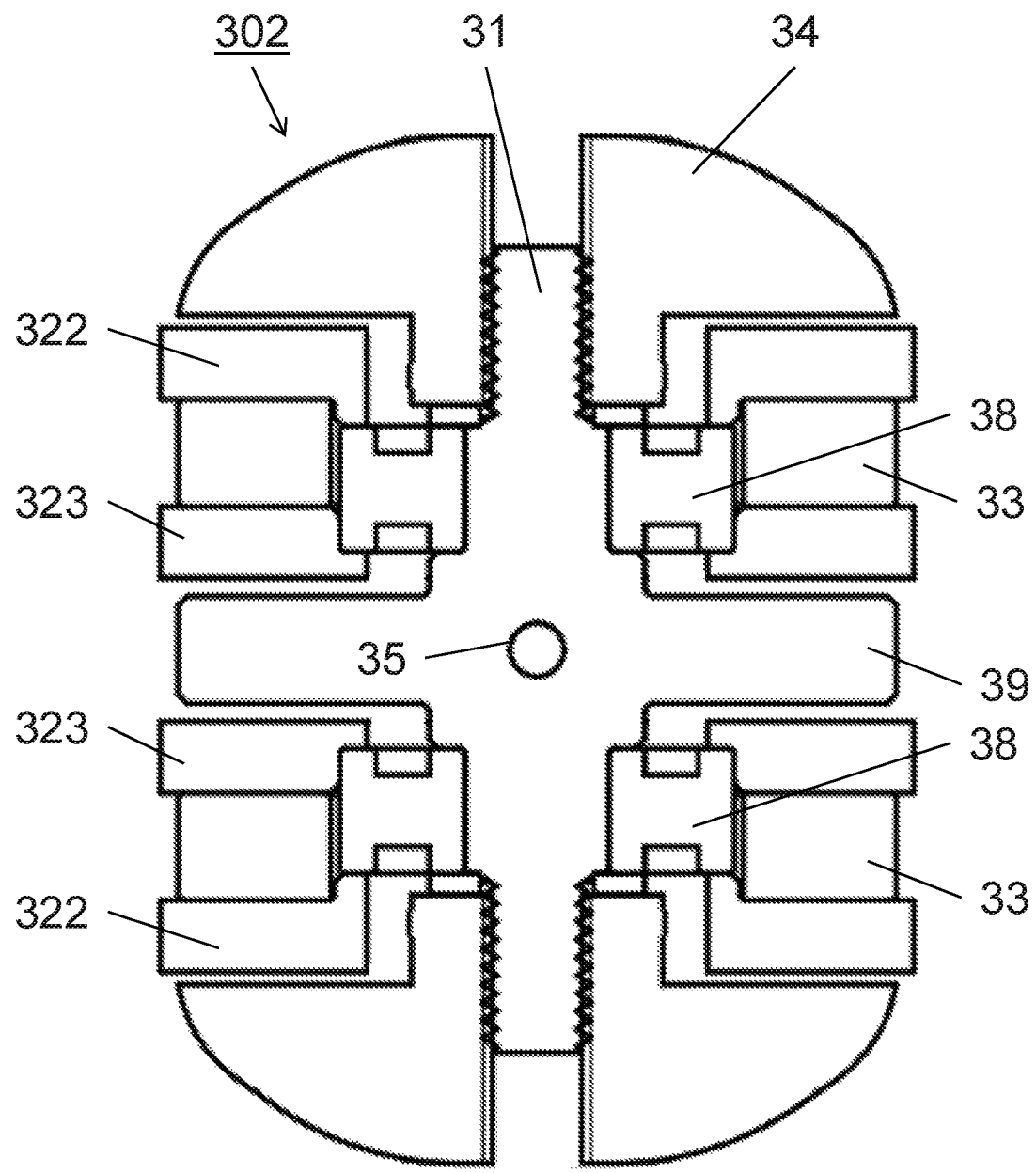
FIG. 13 shows a cross section of the roller end of yet another embodiment of the evacuation tool according to the invention.
Figure 14:
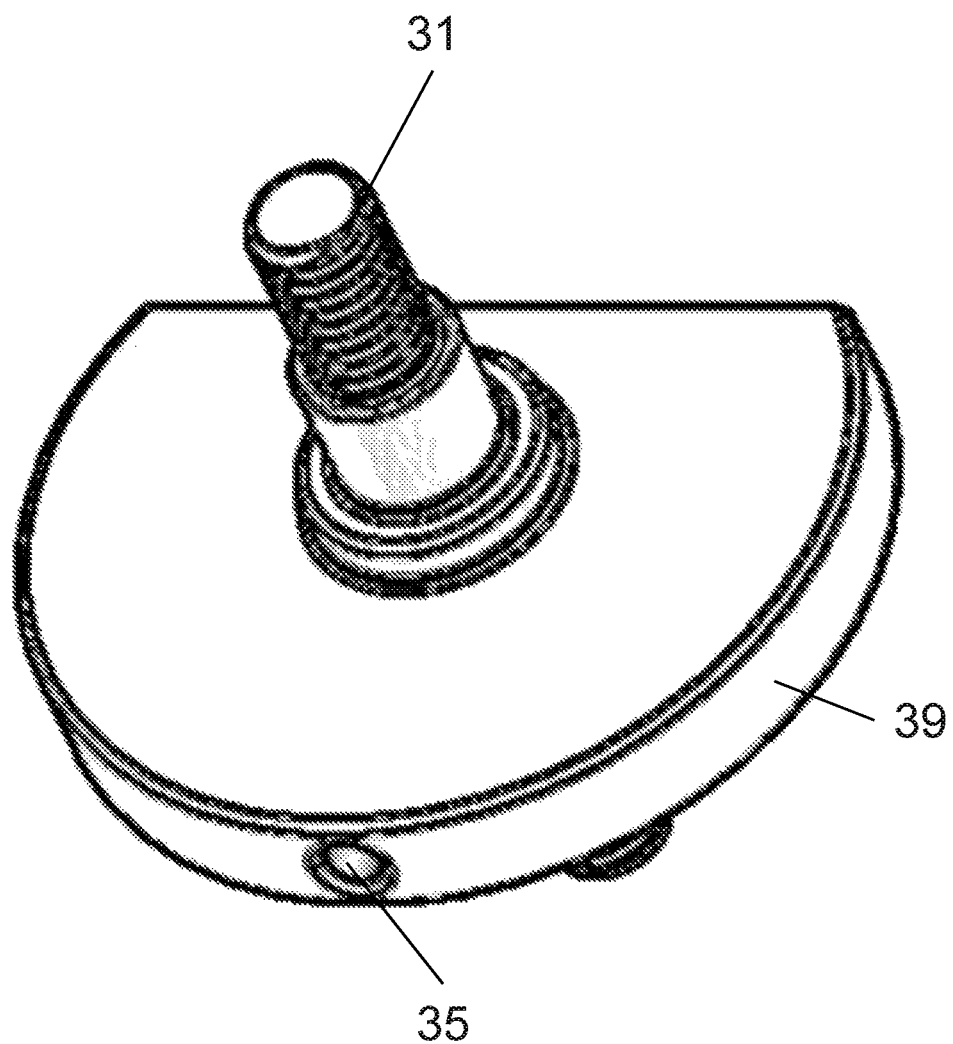
FIG. 14 show a connector body as used in the roller end of FIG. 13.

FIG. 13 shows a cross section of the roller end 302 of yet another embodiment of the evacuation tool 10 according to the invention. An important difference between the embodiments described above and this slightly more complex embodiment is that it does not have any attachment features in the end caps 34. Instead, an attachment feature 35 is provided near the centre of the axle 31, such that a single rope element 11 can be connected directly to the roller end 302. The attachment feature 35 is provided at the outer radius of an asymmetric connector body 39 that is shown in perspective view in FIG. 14. The connector body 39 is asymmetric in the sense that most of its weight is provided at one side of the axle 31. The uneven mass distribution makes it easier for the person to realign the roller end 302 by a simple pull at the rope element 11 and to ensure that the rolling surfaces of the roller bodies 322, 333 are in direct contact with the tower surface.

Another difference with the embodiments described above is the way in which the roller bodies 322, 323 and magnet rings are provided on the axle 31. In this roller end 302, non-magnetic bearings 38 are fixedly attached to the axle 31. The outer bearing ring of the non-magnetic bearings 38 is connected to flanges of two of the roller rings 322, 323. The roller rings are made a ferromagnetic metal or alloy. A magnet ring 33 holds the two roller rings 322, 323 together by magnetic force and thereby clamps the roller rings 322, 323 to the bearing 38. This special arrangement allows the roller rings 322, 323 and the magnet rings to freely rotate about the axle 31, without any friction from the asymmetric connector body 39 or the end caps 34.

Figure 15:
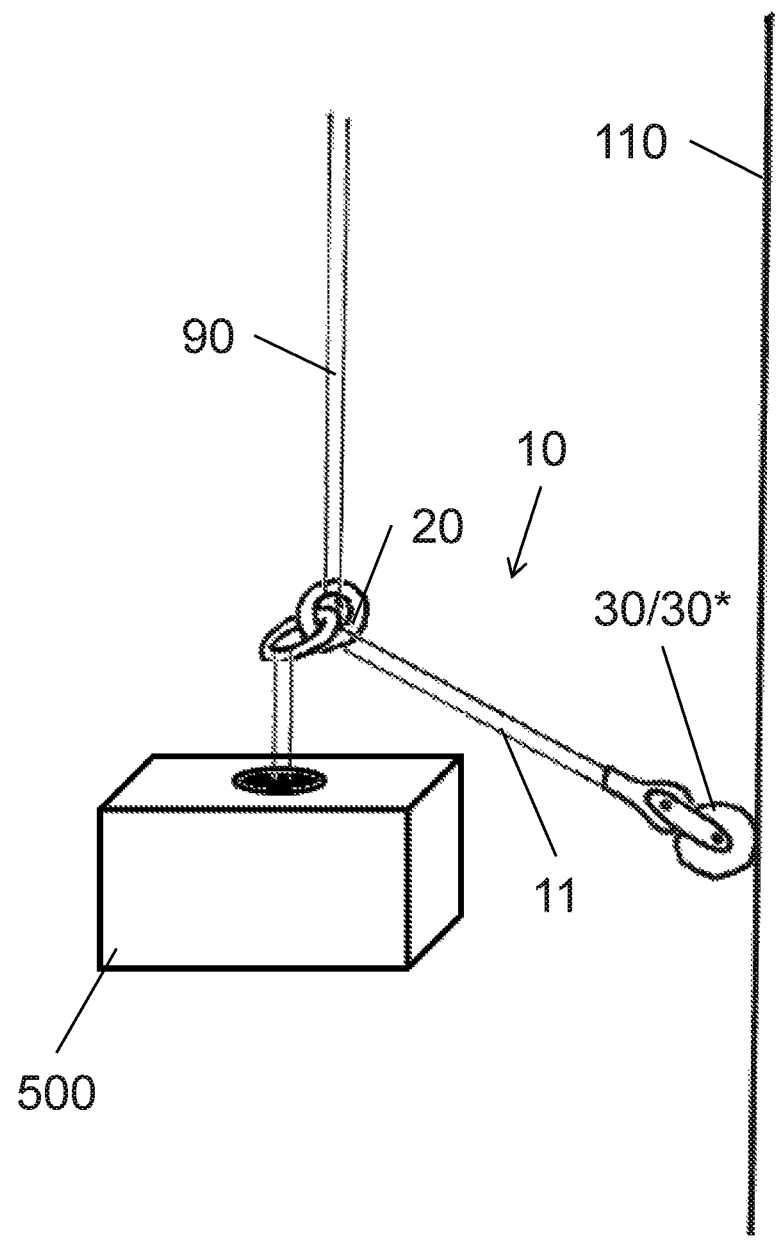
FIG. 15 shows an object being lifted with use of the evacuation tool according to the invention.

With the evacuation tool 10 according to the invention, objects 500 can be transported up and down while keeping within a short distance from the tower surface 110. This avoids the objects 500 swinging around the tower or hitting the tower at high speed, which may cause damage and lead to safety concerns when parts of those objects may come off. FIG. 15 shows an object 500 being lifted with use of the evacuation tool 10 according to the invention. The object 500, e.g. a tool box or a basket with spare parts is attached to the object end 20 of the evacuation tool 10. The object end 20 is further attached to a zip line 90. Alternatively, the zip line 90 is attached to the object 500. A person or a motor lifts the object 500 to the upper level (or to any other desired level) of the wind turbine 100. While being pulled up, the object 500 moves along the tower surface 110 of the wind turbine 100. The roller end 30 rolls over the tower surface 110, while the rope element 11 keeps the object 500 approximately at a constant distance to the tower 11. If the rope element 11 is flexible, e.g. a rope, the evacuation tool 10 keeps the object within a maximum distance of the tower 110. In some embodiments a spring or other type of resilient element may be installed between the rope element 11 and the object and/or roller end 20, 30 for allowing some variation of the distance to the tower and reducing the risk of a sudden gust of wind detaching the roller end from the tower surface 110. Obviously, the evacuation tool 10 can be used in a similar way for transporting objects 500 from the upper level towards the ground.

Many modifications may be made to the specific examples described above without departing from the scope of the invention as defined in the accompanying claims. Features of one embodiment may also be used in other embodiments, either as an addition to such embodiment or as a replacement thereof. For example, the axle 31 of the roller ends 30, 301, 302 of FIGS. 6 to 14 may be replaced by a chord that is pulled through the central openings of the magnet rings 33 and roller rings 32, 321, 322, 323, like in the embodiments of FIGS. 4 and 5. The end caps 34 with rounded corners and/or the roller rings 32, 321, 322, 323 of FIGS. 6-14 may be added to the roller end 303 of FIG. 4.

The invention claimed is:

1. A wind turbine tower evacuation tool for evacuating a person from an upper level of a wind turbine having a steel tower, comprising:
    an evacuation line configured to be connected to the wind turbine and further configured to be connected to the person for controlled descent from the upper level of the wind turbine;
    an object end configured for attachment to the person;
    a roller end configured for connection to a surface of the steel tower by magnetic attraction; and
    a rope element connecting the object end to the roller end,
    wherein the roller end includes at least one magnet body arranged for rotation around a rotational axis of the roller end, and
    wherein the evacuation tool is configured such that as the person descends from the upper level of the wind turbine on the evacuation line, the roller end moves along the surface of the steel tower and the rope element limits the distance the person can move away from the steel tower.

2. The wind turbine tower evacuation tool as claimed in claim 1, wherein said rope element is selected from the group consisting of a rope, a wire, a cord and a chain.

3. The wind turbine tower evacuation tool as claimed in claim 1, wherein the rope element is mounted to said roller end such that a pull of said rope element in a non-radial direction in relation to said rotational axis of the roller end will result in a change of said rotational axis along a non-parallel direction.

4. The wind turbine tower evacuation tool as claimed in claim 1, wherein the rope element is mounted to said roller end such that a pull of said rope element in a non-radial direction in relation to said rotational axis of the roller end will result in a non-uniform pulling force in the roller end along said rotational axis.

5. The wind turbine tower evacuation tool as claimed in claim 1, wherein the magnet body comprises at least one magnet ring.

6. The wind turbine tower evacuation tool as claimed in claim 1, further comprising one or more roller bodies, arranged coaxially with the magnet body for rotation therewith.

7. The wind turbine tower evacuation tool as claimed in claim 6, further comprising an axle defining the rotational axis, at least two of said roller bodies and the at least one magnet body being provided on the axle, the magnet body being provided in between the at least two roller bodies.

8. The wind turbine tower evacuation tool as claimed in claim 7, wherein the roller bodies and the at least one magnet body are fixedly connected to the axle for rotation therewith.

9. The wind turbine tower evacuation tool as claimed in claim 7, wherein the roller bodies and the at least one magnet body are rotatably provided on the axle for rotation relative thereto.

10. The wind turbine tower evacuation tool as claimed in claim 7, wherein the roller end further comprises an asymmetrically shaped connector body, centrally provided on the axle and radially extending therefrom, the connector body comprising a connector attachment feature for the attachment of the rope element to the roller end, the attachment feature being arranged so as not to rotate together with the roller bodies.

11. The wind turbine tower evacuation tool as claimed in claim 6, wherein the one or more roller bodies comprise a magnetic metal.

12. The wind turbine tower evacuation tool as claimed in claim 6, wherein an outer radius of the one or more roller bodies is larger than an outer radius of the at least one magnet body.

13. The wind turbine tower evacuation tool as claimed in claim 6, wherein the at least two roller bodies are roller rings.

14. The wind turbine tower evacuation tool as claimed in claim 13, wherein the roller end comprises more roller bodies than magnet bodies.

15. The wind turbine tower evacuation tool as claimed in claim 1, wherein the roller end comprises a plurality of roller bodies and a plurality of magnet bodies, alternatingly provided along the rotational axis.

16. The wind turbine tower evacuation tool as claimed in claim 15, wherein all the magnet bodies have the same magnetic orientation.

17. The wind turbine tower evacuation tool as claimed in claim 15, wherein at least two of the magnet bodies have opposite magnetic orientations.

18. The wind turbine tower evacuation tool as claimed in claim 15, wherein the plurality of magnet bodies is an uneven number.

19. The wind turbine tower evacuation tool as claimed in claim 1, wherein the roller end comprises two non-magnetic end caps, provided around the rotational axis.

20. The wind turbine tower evacuation tool as claimed in claim 19, wherein the end caps have an outer radius that is smaller than the outer radius of the roller bodies.

21. The wind turbine tower evacuation tool as claimed in claim 19, wherein the end caps have a conical, frustoconical or frustospherical shape.

22. The wind turbine tower evacuation tool as claimed in claim 19, wherein the end caps comprise connector attachment features for attachment of the rope element to the roller end, the attachment features being arranged so as not to rotate together with the roller bodies.

23. The wind turbine tower evacuation tool as claimed in claim 22, wherein the attachment features are positioned at a radially outward portion of the end caps.

24. The wind turbine tower evacuation tool as claimed in claim 1, wherein the roller end further comprises a non-magnetic core body that is provided around the rotational axis and radially inward of the at least one magnet body.

25. The wind turbine tower evacuation tool as claimed in claim 1, wherein the rope element comprises a spring.

26. The wind turbine tower evacuation tool as claimed in claim 1, wherein said object end of said wind turbine tower evacuation tool further comprises means mounted on said rope element for connecting said object end securely to a belt or some other part of a uniform of said person.

27. The wind turbine tower evacuation tool as claimed in claim 1, wherein said wind turbine tower evacuation tool comprises means for shooting the roller end towards the steel tower.

28. The wind turbine tower evacuation tool as claimed in claim 1, wherein said wind turbine tower evacuation tool further comprises equipment to releasably attach to and perform a controlled descent along the evacuation line for the person.

29. A wind turbine comprising the steel tower and the upper level, the upper level comprising an evacuation line connection point, the wind turbine further comprising the tower evacuation tool as claimed in claim 1, wherein the evacuation line is configured to connect to the evacuation line connecton point to allow the person to use the evacuation line for a controlled descent from the upper level of the wind turbine.

30. The wind turbine according to claim 29, wherein said connection point is at least 1 m radially displaced outwards from the steel tower of said wind turbine.

31. The wind turbine according to claim 29, wherein the roller end of said evacuation tool is attached to said tower and the object end of said evacuation tool is less than 1 m from said evacuation line.

32. The wind turbine as claimed in claim 29, wherein said evacuation line is a rope or a wire.

33. The wind turbine as claimed in claim 29, wherein said evacuation line is accommodated in a flaked or coiled state when not in use.

34. A method of evacuating a person from an upper level of a wind turbine having a steel tower making use of a wind turbine tower evacuation tool comprising an evacuation line, an object end, a roller end, and a rope element connected between the object end and the roller end, the method comprising:
　connecting the person to the evacuation line and to the object end, the person leaving the upper level and using the evacuation line for a controlled descent from the upper level of the wind turbine,
　throwing or otherwise bringing the roller end of the evacuation tool in close proximity to a surface of the steel tower, and
　connecting the roller end to the surface of the tower by magnetic attraction, and
　descending from the upper level of the wind turbine such that the roller end rolls over the surface of the steel tower during and the rope element limits the distance the person can move away from the steel tower.

35. The method of evacuating a person as claimed in claim 34, wherein said evacuation line is connected to a connection point in said upper level which is at least 1 m radially displaced outwards from the steel tower of said wind turbine.

36. The method of evacuating a person as claimed in claim 34, wherein said connection of the person to the object end comprises connecting said object end securely to a belt or some other part of a uniform of said person.

37. The method of evacuating a person as claimed in claim 34, further comprising, when the roller end is magnetically attached to the surface of the tower, the person pulling on the rope element in order to bring a rotational axis of the roller end in parallel alignment with a horizontal tangent to the surface of the tower.

38. The method of evacuating a person as claimed in claim 34, wherein the person pulls said rope element in a non-radial direction in relation to said rotational axis of the roller end in order to change said rotational axis along a non-parallel direction.

39. The method of evacuating a person as claimed in claim 34, further comprising, while the roller end is rolling over the surface of the tower, the person pulling on the rope element in order to get closer to the surface of the steel tower.

40. The method of evacuating a person as claimed in claim 34, further comprising, while the roller end is rolling over the surface of the tower, the person controllably releasing the rope element in order to allow further separation from the surface of the steel tower.

41. The method of evacuating a person as claimed in claim 34, wherein the wind turbine evacuation tool is a wind turbine tower evacuation tool.

* * * * *